United States Patent
Han et al.

(10) Patent No.: US 9,823,963 B2
(45) Date of Patent: Nov. 21, 2017

(54) APPARATUS AND METHOD FOR CONTROLLING LEVEL 0 CACHE

(71) Applicant: ELECTRONICS AND TELECOMMUNICATIONS RESEARCH INSTITUTE, Daejeon (KR)

(72) Inventors: Jin-Ho Han, Seoul (KR); Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 130 days.

(21) Appl. No.: 15/006,921

(22) Filed: Jan. 26, 2016

(65) Prior Publication Data

US 2016/0224416 A1     Aug. 4, 2016

(30) Foreign Application Priority Data

Feb. 3, 2015    (KR) .................... 10-2015-0016770

(51) Int. Cl.

| | |
|---|---|
| *G06F 12/00* | (2006.01) |
| *G06F 11/10* | (2006.01) |
| *G06F 12/0855* | (2016.01) |
| *G06F 12/0831* | (2016.01) |
| *G06F 12/128* | (2016.01) |

(Continued)

(52) U.S. Cl.
CPC ........ *G06F 11/1064* (2013.01); *G06F 11/141* (2013.01); *G06F 12/0811* (2013.01); *G06F 12/0833* (2013.01); *G06F 12/0855* (2013.01); *G06F 12/128* (2013.01); *G06F 2212/283* (2013.01); *G06F 2212/621* (2013.01)

(58) Field of Classification Search
None
See application file for complete search history.

(56) References Cited

U.S. PATENT DOCUMENTS

| 6,314,491 B1 | 11/2001 | Freerksen et al. |
| 2004/0153749 A1* | 8/2004 | Schwarm ............ G06F 11/2038 |
| | | 714/11 |

(Continued)

FOREIGN PATENT DOCUMENTS

| JP | 2011-257966 A | 12/2011 |
| JP | 2013-205856 A | 10/2013 |

(Continued)

*Primary Examiner* — John A Lane

(57) ABSTRACT

Disclosed herein is an apparatus and method for controlling level 0 caches, capable of delivering data to a processor without errors and storing error-free data in the caches even when soft errors occur in the processor and caches. The apparatus includes: a level 0 cache #0 connected to the load/store unit of a first processor; a level 0 cache #1 connected to the load/store unit of a second processor; and a fault detection and recovery unit for reading from and writing to tag memory, data memory, and valid bit memory of the level 0 cache #0 and the level 0 cache #1, performing the write-back and flush of the level 0 cache #0 and the level 0 cache #1 based on information stored therein, and instructing the load/store units of the first and second processors to stall a pipeline and to restart an instruction #n.

13 Claims, 7 Drawing Sheets

(51) Int. Cl.
    *G06F 12/0811*    (2016.01)
    *G06F 11/14*     (2006.01)

(56) References Cited

U.S. PATENT DOCUMENTS

| | | | |
|---|---|---|---|
| 2004/0210795 A1* | 10/2004 | Anderson | G06F 11/1666 |
| | | | 714/5.11 |
| 2008/0201563 A1* | 8/2008 | Dale | G06F 9/3824 |
| | | | 712/234 |
| 2011/0099334 A1 | 4/2011 | Kwon et al. | |
| 2012/0042126 A1 | 2/2012 | Krick et al. | |
| 2012/0117428 A1 | 5/2012 | Fukuda | |
| 2014/0095794 A1 | 4/2014 | Moses et al. | |
| 2014/0223102 A1 | 8/2014 | Yamada et al. | |
| 2015/0006935 A1 | 1/2015 | Han et al. | |
| 2016/0119148 A1* | 4/2016 | Ghose | G06F 9/3851 |
| | | | 713/176 |
| 2016/0179284 A1* | 6/2016 | McGowan | G06F 3/0418 |
| | | | 345/173 |
| 2016/0378593 A1* | 12/2016 | Takeda | G06F 12/0811 |
| | | | 714/755 |

FOREIGN PATENT DOCUMENTS

| | | |
|---|---|---|
| KR | 10-2000-0076752 A | 12/2000 |
| KR | 10-2012-0049798 A | 5/2012 |

\* cited by examiner

APPARATUS AND METHOD FOR CONTROLLING LEVEL 0 CACHE

CROSS REFERENCE TO RELATED APPLICATION

This application claims the benefit of Korean Patent Application No. 10-2015-0016770, filed Feb. 3, 2015, which is hereby incorporated by reference in its entirety into this application.

BACKGROUND OF THE INVENTION

1. Technical Field

The present invention generally relates to an apparatus and method for controlling a level 0 cache and, more particularly, to an apparatus and method for controlling a level 0 cache in order to prevent a fault caused by a soft error.

2. Description of the Related Art

Generally, a cache is located between a processor and main memory. A cache enables faster responses than main memory, which has a low access speed in comparison to the fast processing speed of a processor, and is memory that has a smaller capacity than main memory.

A cache temporarily stores instructions and data, required by a processor, along with the addresses thereof. When external factors cause an error in the cache, the processor may read the wrong instruction from the cache and consequently perform an unwanted operation, or may not interpret the instruction (in other words, the instruction may be a non-existent instruction). Also, when an error occurs in the cache due to external factors, incorrect data may be read from the cache, and a program executed by the processor may output a result that differs from the expected result. Therefore, when external factors cause an error in a processor and a cache, it is necessary to correct the error in order to prevent a fault.

As a related art pertaining to the present invention, there are US Patent No. 2014-0223102, titled "Flush control apparatus, flush control method and cache memory apparatus", US Patent No. 2014-0095794, titled "Apparatus and method for reducing the flushing time of a cache", and US Patent No. 2012-0042126, titled "Method for concurrent flush of L1 and L2 caches".

SUMMARY OF THE INVENTION

Accordingly, the present invention has been made keeping in mind the above problems, and an object of the present invention is to provide an apparatus and method for controlling a level 0 cache that is capable of delivering data to a processor without errors and storing error-free data in the cache even if a soft error occurs in the processor or cache.

In order to accomplish the above object, an apparatus for controlling a level 0 cache according to a preferred embodiment of the present invention includes: a level 0 cache #0 that is connected to a load/store unit of a first processor; a level 0 cache #1 that is connected to a load/store unit of a second processor; and a fault detection and recovery unit for reading from and writing to tag memory, data memory, and valid bit memory of the level 0 cache #0 and the level 0 cache #1, controlling the level 0 cache #0 and the level 0 cache #1 to perform a write-back operation and a flush operation, and instructing the load/store unit of the first processor and the load/store unit of the second processor to stall a pipeline and to restart an instruction #n.

The fault detection and recovery unit may check a number of {address, data} entries stored in the level 0 cache #0 and the level 0 cache #1 whenever a new address and data are stored in the level 0 cache #0 and the level 0 cache #1, and cause the pipeline to be stalled if the number of {address, data} entries stored in the level 0 cache #0 and the level 0 cache #1 is equal to or greater than N, where N is a predetermined positive integer.

The fault detection and recovery unit may prevent a request for reading from and writing to the level 0 cache #0 and the level 0 cache #1 from being received while the pipeline is stalled.

The fault detection and recovery unit may check a number of {address, data} entries stored in the level 0 cache #0 and the level 0 cache #1 whenever a new address and data are stored in the level 0 cache #0 and the level 0 cache #1, and continue storing the new address and data if the number of {address, data} entries stored in the level 0 cache #0 and the level 0 cache #1 is less than N, where N is a predetermined positive integer.

The fault detection and recovery unit may check whether values in corresponding positions are equal to each other by reading from the data memory, the tag memory, and the valid bit memory of the level 0 cache #0 and the level 0 cache #1, and write all {address, data} entries in the level 0 cache #0 and the level 0 cache #1 to a level 1 cache #0 and a level 1 cache #1 if all the values in the corresponding positions are equal to each other.

The fault detection and recovery unit may check whether values in corresponding positions are equal to each other by reading from the data memory, the tag memory, and the valid bit memory of the level 0 cache #0 and the level 0 cache #1, and delete all {address, data} entries in the level 0 cache #0 and the level 0 cache #1 if any of the values in the corresponding positions are not equal to each other.

The fault detection and recovery unit may instruct the load/store unit of the first processor and the load/store unit of the second processor to restart the instruction #n after deleting all {address, data} entries in the level 0 cache #0 and the level 0 cache #1.

Meanwhile, a method for controlling a level 0 cache according to a preferred embodiment of the present invention includes: checking, by a fault detection and recovery unit, a number of {address, data} entries stored in a level 0 cache #0 and a level 0 cache #1 whenever a new address and data from a load/store unit of a first processor and a load/store unit of a second processor are stored in the level 0 cache #0 and the level 0 cache #1; stalling, by the fault detection and recovery unit, a pipeline when the number of {address, data} entries stored in the level 0 cache #0 and the level 0 cache #1 is equal to or greater than N, where N is a predetermined positive integer; reading from, by the fault detection and recovery unit, data memory, tag memory, and valid bit memory of the level 0 cache #0 and the level 0 cache #1, after stalling the pipeline; and performing, by the fault detection and recovery unit, a write-back operation or a flush operation depending on whether values in corresponding positions are equal to each other based on the read information.

Stalling the pipeline may be configured to prevent a request for reading from and writing to the level 0 cache #0 and the level 0 cache #1 from being received.

Performing the write-back operation or the flush operation may be configured to write all the {address, data} entries in the level 0 cache #0 and the level 0 cache #1 to a level 1 cache #0 and a level 1 cache #1 if all values in corresponding positions are equal to each other based on the read information.

Performing the write-back operation or the flush operation may be configured to delete all {address, data} entries in the level 0 cache #0 and the level 0 cache #1 if any values in corresponding positions are not equal to each other based on the read information.

The method for controlling a level 0 cache may further include instructing the load/store unit of the first processor and the load/store unit of the second processor to restart an instruction #n after deleting all {address, data} entries in the level 0 cache #0 and the level 0 cache #1.

The method for controlling a level 0 cache may further include continuing to store the new address and data if the number of {address, data} entries stored in the level 0 cache #0 and the level 0 cache #1 is less than N as a result of checking the number of {address, data} entries stored in the level 0 cache #0 and the level 0 cache #1.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
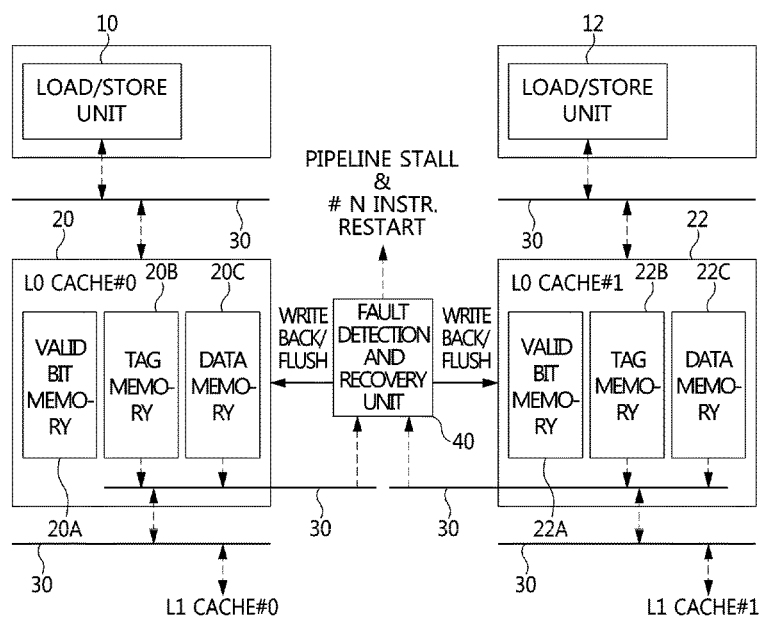
FIG. 1 is a block diagram of an apparatus for controlling a level 0 cache according to an embodiment of the present invention.

The present invention may be variously changed, and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not to be interpreted as having ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a block diagram of an apparatus for controlling a level 0 cache according to an embodiment of the present invention.

The apparatus for controlling a level 0 cache according to an embodiment of the present invention is located between a processor and memory. The apparatus for controlling a level 0 cache (hereinafter, level 0 is represented as "L0") according to an embodiment of the present invention includes L0 cache #0 20, L0 cache #1 22, and a fault detection and recovery unit 40.

The L0 cache #0 20 and the L0 cache #1 22 respectively include valid bit memory 20a and 22a, tag memory 20b and 22b, and data memory 20c and 22c. The data memory 20c and 22c store data in response to a request by a processor, the tag memory 20b and 22b store the addresses of the data stored in the corresponding data memory 20c and 22c, and the valid bit memory 20a and 22a indicate that instructions or data are stored.

Here, the L0 cache #0 20 is located between the load/store unit 10 of a first processor and level 1 cache #0 (hereinafter, level 1 is represented as "L1"). The L0 cache #1 22 is located between the load/store unit 12 of a second processor and L1 cache #1. With regard to a memory hierarchy, there are level 2 (L2) caches or SDRAM in the lower level of the L1 caches.

When there are two processors, the L0 cache #0 20 and the L0 cache #1 22, connected to the two processors, communicate with the fault detection and recovery unit 40, and are controlled by the fault detection and recovery unit 40 when a fault is detected.

To this end, the fault detection and recovery unit 40 may read from and write to the tag memory 20c and 22c, the data memory 20b and 22b, and the valid bit memory 20a and 22a of the L0 cache #0 20 and L0 cache #1 22. Also, the fault detection and recovery unit 40 may perform a write-back and a flush of the L0 cache #0 20 and L0 cache #1 22 based on the information stored therein. Also, the fault detection and recovery unit 40 may instruct all units in the processors, including the load/store units 10 and 20, to stall a pipeline and to restart an instruction #n.

Hereinafter, the write-back, the flush, stalling a pipeline, and restarting the instruction #n are described.

First, the write-back operation writes addresses and data that are stored in the tag memory 20b and 22b and data memory 20c and 22c of the L0 caches to the L1 caches (L1 cache #0 and L1 cache #1), and initializes the values of the valid bit memory 20a and 22a to "0". This operation is performed when the data, stored in the L0 caches 20 and 22, are not erroneous.

The flush operation deletes the data and addresses that have been stored in the L0 caches 20 and 22 without writing them to the L1 caches.

Also, before determining whether to perform the write-back operation or the flush operation, processors stall a pipeline in order to delay the execution of instructions in the pipeline, so that the internal units of the processors stop their operations.

The processors restart instructions from an instruction #n, the instruction number of which is n. Here, the instruction #n creates data corresponding to the first data that had been stored in the L0 caches 20 and 22 before the flush.

In FIG. 1, reference numeral 30 represents a bus.

Figure 2:
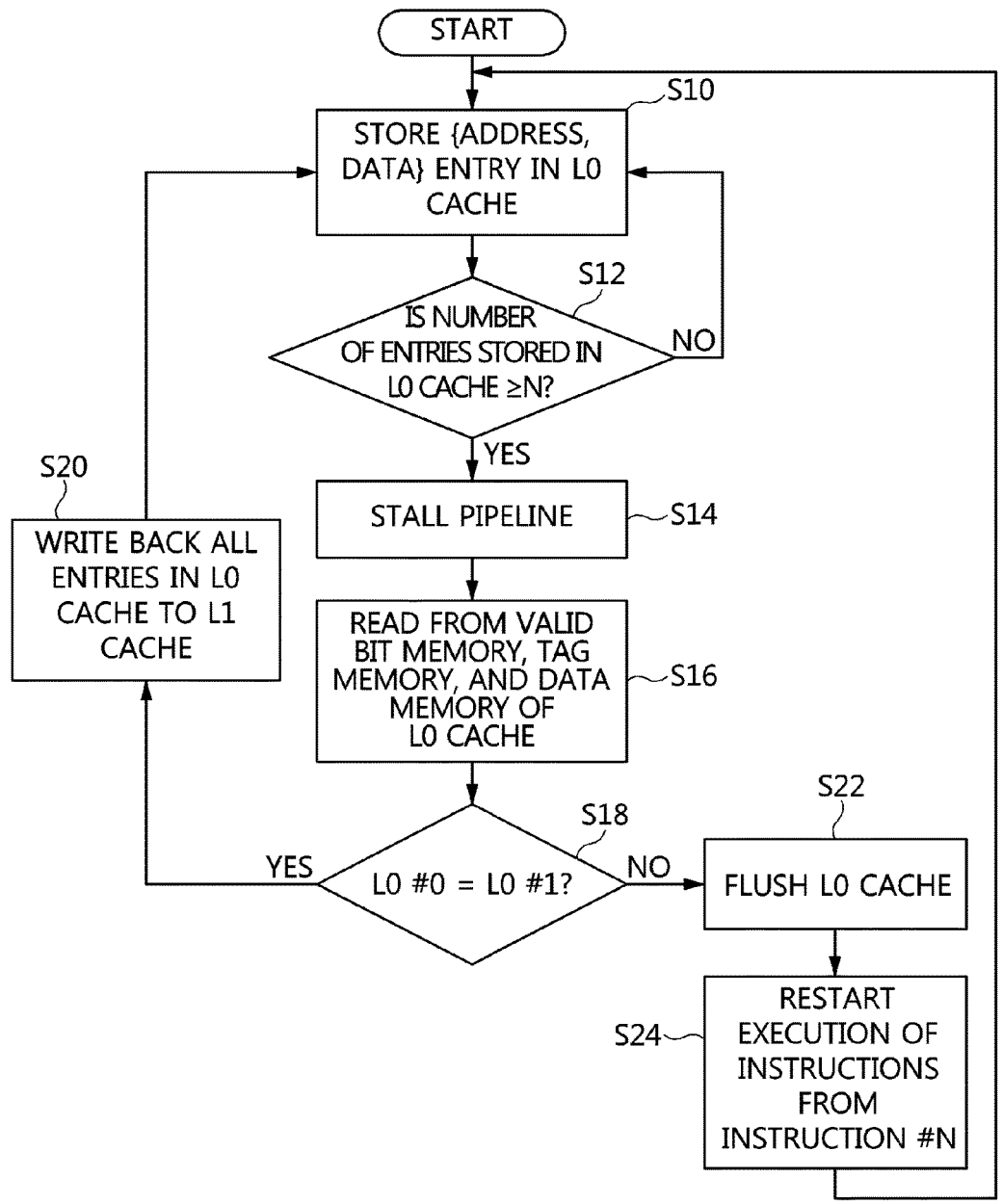
FIG. 2 is a flowchart illustrating a method for controlling a level 0 cache according to an embodiment of the present invention.

Hereinafter, the method of operation of the L0 caches 20 and 22 and the fault detection and recovery unit 40 will be described. The following description is about a process in which data have been stored in the L0 caches 20 and 22 for a certain processing time, the data are checked, the data, stored in the L0 caches 20 and 22, are written to the L1 caches or are deleted, and the processors stall a pipeline or restart the instruction #n. These operations may be repeatedly performed. FIG. 2 is a flowchart illustrating a method for controlling a L0 cache according to an embodiment of the present invention, and FIGS. 3 to 6 are views for the description of FIG. 2.

Figure 3:
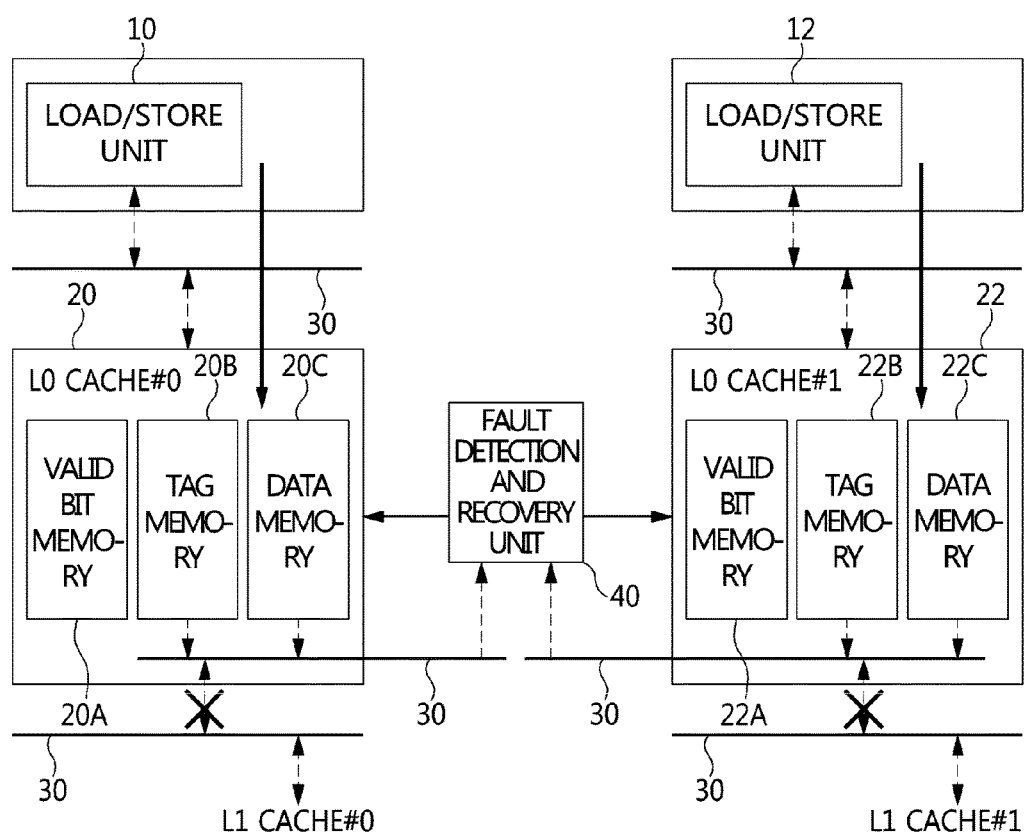
FIGS. 3 to 6 are views for the description of FIG. 2.

First, as shown in FIG. 3, the load/store units 10 and 20 read from and write to the L0 caches 20 and 22 for load and store operations. In this case, the L0 caches 20 and 22 do not access the L1 caches. In other words, at step S10, {address, data} may be stored as an entry in the L0 caches 20 and 22.

Figure 4:
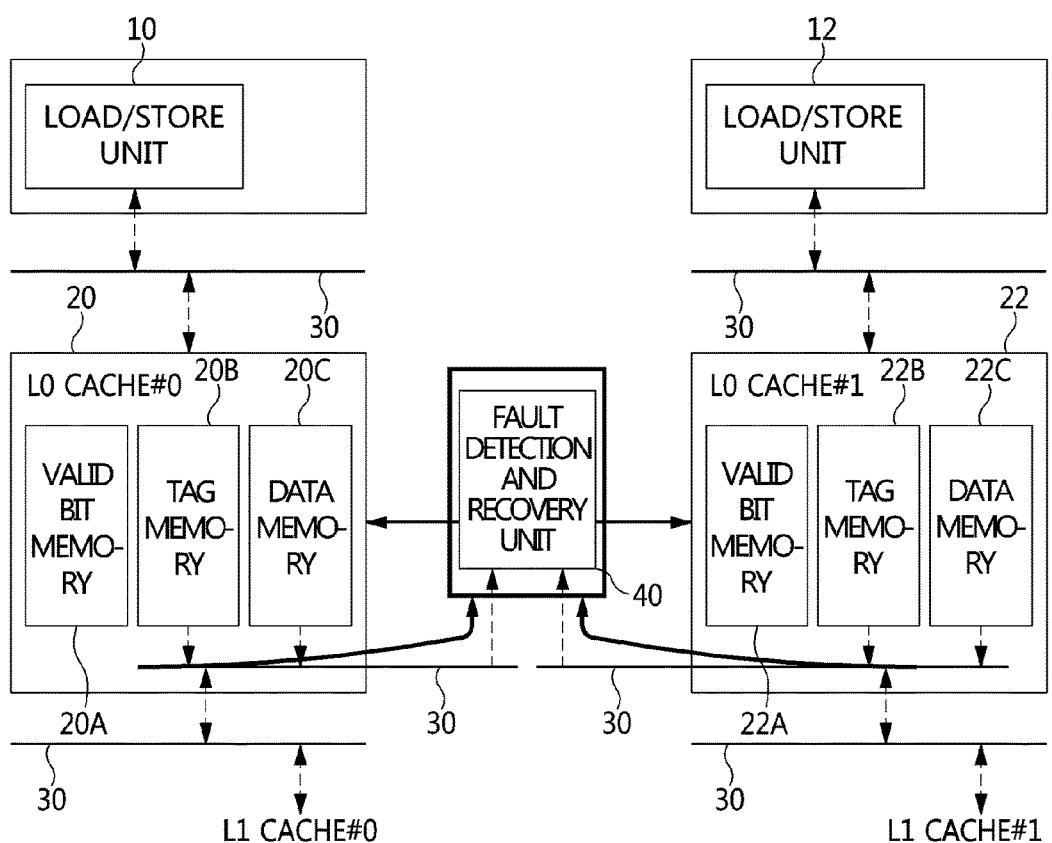

Then, as shown in FIG. 4, whenever a new address and data are stored in the L0 caches 20 and 22, the fault detection and recovery unit 40 checks the number of entries (that is, {address, data}), stored in the L0 caches 20 and 22, at step S12.

Here, when the number of entries stored in the L0 caches 20 and 22 is less than N ("NO" at step S12), the new entry (that is, {address, data}) has been stored. Here, N is a predetermined positive integer.

Figure 5:
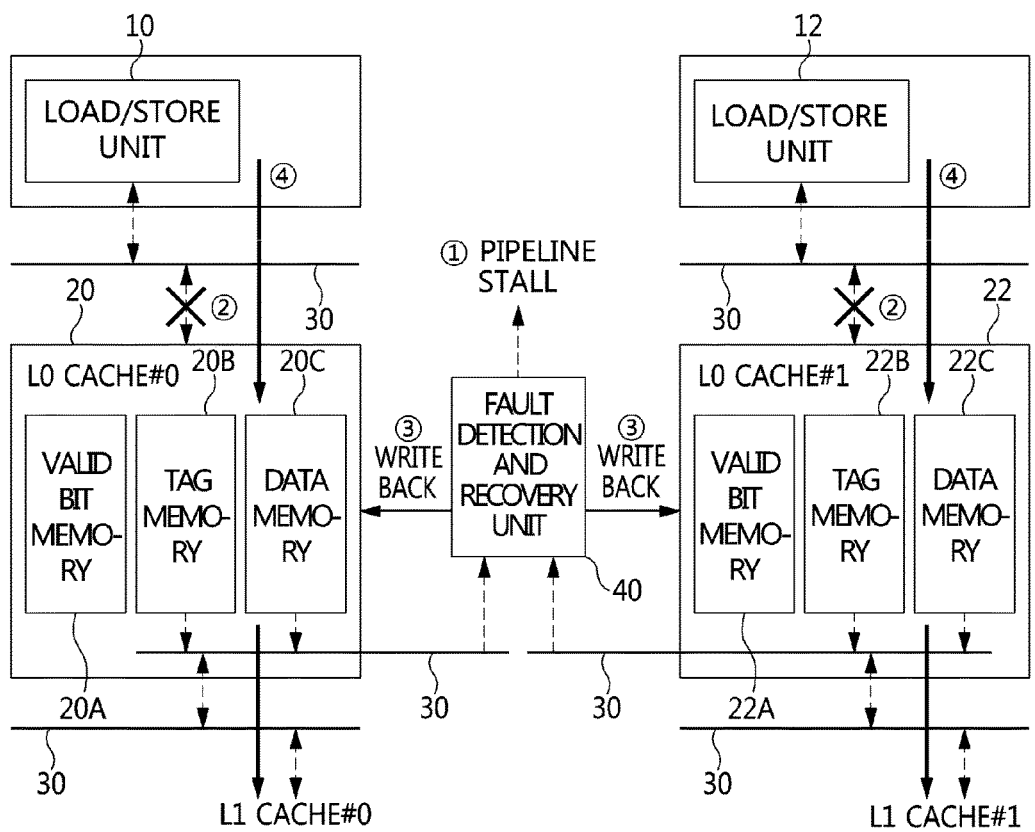

Conversely, when the number of entries stored in the L0 caches 20 and 22 is equal to or greater than N ("YES" at step S12), the fault detection and recovery unit 40 causes a pipeline to be stalled at step S14 (① in FIG. 5). In other words, because the fault detection and recovery unit 40 instructs the load/store units 10 and 12 to stall the pipeline, a request for reading from or writing to the L0 caches 20 and 22 is prevented while the pipeline is stalled (② in FIG. 5).

Subsequently, the fault detection and recovery unit 40 reads from the data memory 20b and 22b, the tag memory 20c and 22c, and the valid bit memory 20a and 22a of the L0 cache #0 20 and the L0 cache #1 22 and checks whether the values of the L0 cache #0 and the L0 cache #1 at the same positions are equal to each other at steps S16 and S18.

When all the values at the same positions are equal to each other ("YES" at step S18), the fault detection and recovery unit 40 writes all the {address, data} entries stored in the L0 cache #0 20 and the L0 cache #1 22 to the L1 cache #0 and the L1 cache #1 at step S20 (③ in FIG. 5). Subsequently, as shown in FIG. 5, the L0 cache #0 20 and the L0 cache #1 22 receive a new {address, data} from the load/store units 10 and 12 (④ in FIG. 5). Here, when the process of ④ in FIG. 5 progresses, the process of ② in FIG. 5 has been released prior thereto.

Figure 6:
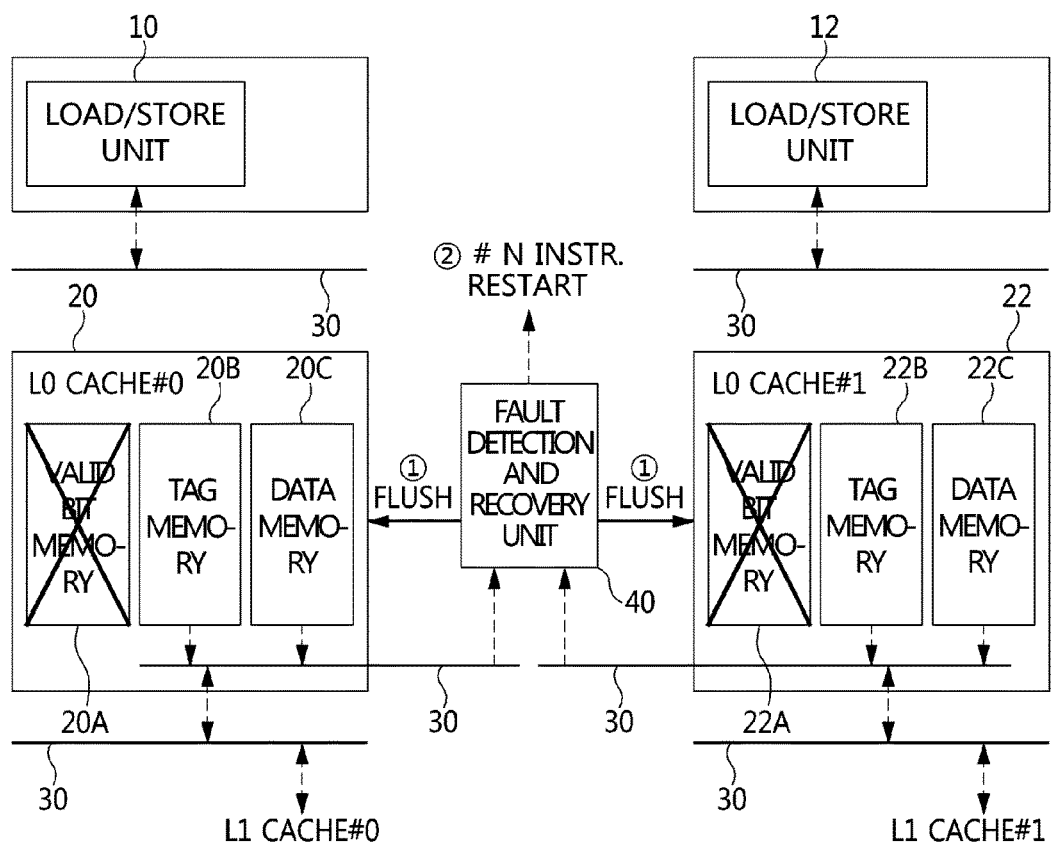

Conversely, when any pair of values at the same positions are not equal to each other ("NO" at step S 18), the fault detection and recovery unit 40 flushes the L0 caches at step S22, as shown in FIG. 6 (① in FIG. 6). That is, all {address, data} entries in the L0 cache #0 20 and the L0 cache #1 22 are deleted at step S22. Then, the fault detection and recovery unit 40 instructs the load/store units 10 and 12 to restart the instruction #n at step S24. Accordingly, the load/store units 10 and 12 resumes the execution of instructions from the instruction #n (② in FIG. 6).

As described above, the L0 caches 20 and 22 and the fault detection and recovery unit 40 repeatedly perform the above processes to prevent errors in the processor and the L0 caches 20 and 22 and enable the processor and the L0 caches 20 and 22 to recover from errors when such errors occur.

Figure 7:
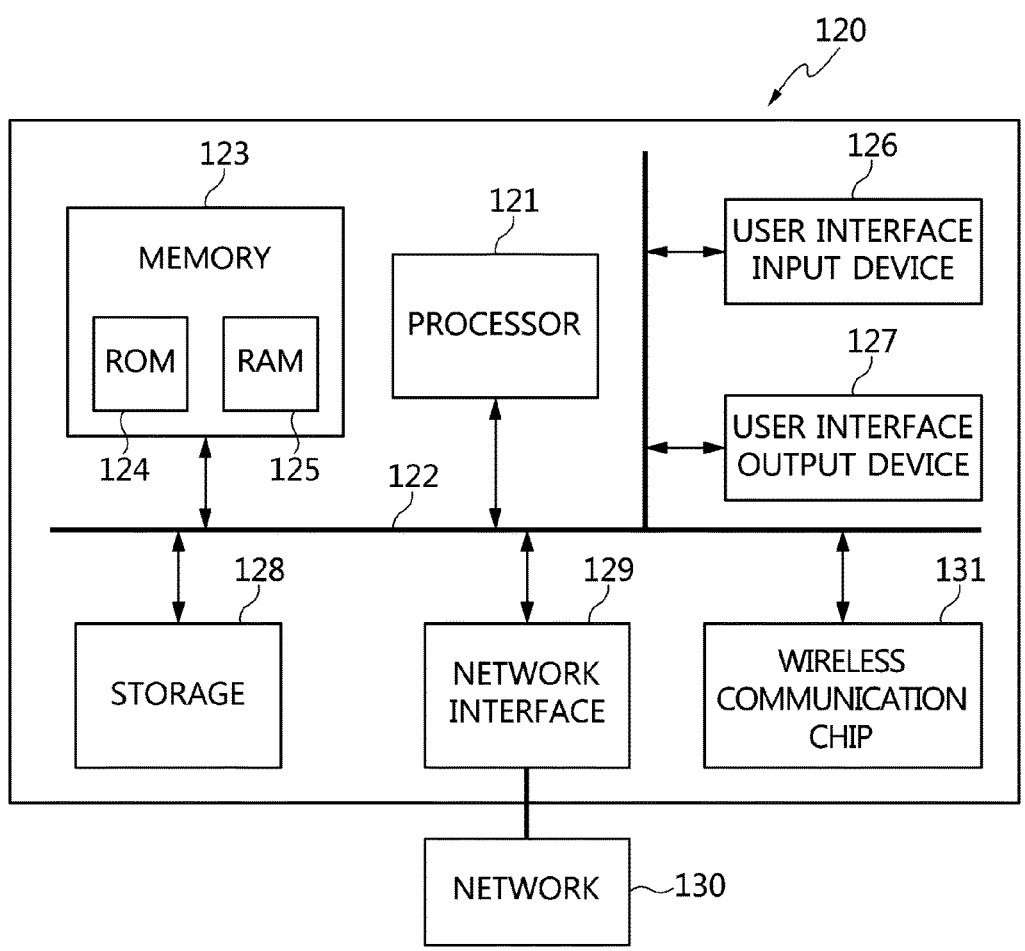
FIG. 7 is a view illustrating an example of a computer system in which an embodiment of the present invention is implemented.

Meanwhile, the above-mentioned embodiment of the present invention may be implemented in a computer system. As illustrated in FIG. 7, a computer system 120 may include one or more processors 121, memory 123, a user interface input device 126, a user interface output device 127, and storage 128, which communicate with each other through a bus 122. Also, the computer system 120 may further include one or more network interfaces 129 that are connected to a network 130. The processors 121 may be a semiconductor device for executing processing instructions stored in a central processing unit, the memory 123, or the storage 128. The memory 123 and the storage 128 may be various types of volatile or non-volatile storage media. For example, the memory 123 may include ROM 124 or RAM 125.

Also, if the computer system 120 is implemented as a small-scale computing device to prepare for the Internet of Things (IoT), when an Ethernet cable is connected to the computing device, the computing device may be operated as a wireless router. In this case, because a mobile device may wirelessly connect to the gateway and perform encryption and decryption functions, the computer system 120 may further include a wireless communication chip (a Wi-Fi chip) 131.

Therefore, the embodiment of the present invention may be implemented as a method implemented by a computer or a non-volatile computer-readable medium in which instructions executable by a computer are recorded. When computer-readable instructions are executed by a processor, the computer-readable instructions may perform the method according to at least one aspect of the present invention.

According to the present invention, a fault detection and recovery unit may detect an error of data stored in a level 0 cache and prevent data having an error from being stored in a level 1 cache. Therefore, faulty processing attributable to the incorrect operation of the processor may be prevented.

In other words, when an error occurs in the operation of a processor and then causes an error in the data, which are cached by a load/store unit, the conventional art may not detect the error in the data, but the present invention may detect it.

As described above, optimal embodiments of the present invention have been disclosed in the drawings and the specification. Although specific terms have been used in the present specification, these are merely intended to describe the present invention, and are not intended to limit the meanings thereof or the scope of the present invention as described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for controlling a level 0 cache, comprising:
   a level 0 cache #0 that is connected to a load/store unit of a first processor;
   a level 0 cache #1 that is connected to a load/store unit of a second processor; and
   a fault detection and recovery unit for reading from and writing to tag memory, data memory, and valid bit memory of the level 0 cache #0 and the level 0 cache #1, controlling the level 0 cache #0 and the level 0 cache #1 to perform a write-back operation and a flush operation, and instructing the load/store unit of the first processor and the load/store unit of the second processor to stall a pipeline and to restart an instruction #n.

2. The apparatus of claim 1, wherein the fault detection and recovery unit checks a number of {address, data} entries stored in the level 0 cache #0 and the level 0 cache #1 whenever a new address and data are stored in the level 0 cache #0 and the level 0 cache #1, and causes the pipeline to be stalled if the number of {address, data} entries stored in the level 0 cache #0 and the level 0 cache #1 is equal to or greater than N, where N is a predetermined positive integer.

3. The apparatus of claim 2, wherein the fault detection and recovery unit prevents a request for reading from and writing to the level 0 cache #0 and the level 0 cache #1 from being received while the pipeline is stalled.

4. The apparatus of claim 1, wherein the fault detection and recovery unit checks a number of {address, data} entries stored in the level 0 cache #0 and the level 0 cache #1 whenever a new address and data are stored in the level 0 cache #0 and the level 0 cache #1, and continues storing the new address and data if the number of {address, data} entries stored in the level 0 cache #0 and the level 0 cache #1 is less than N, where N is a predetermined positive integer.

5. The apparatus of claim 1, wherein the fault detection and recovery unit checks whether values in corresponding positions are equal to each other by reading from the data memory, the tag memory, and the valid bit memory of the level 0 cache #0 and the level 0 cache #1, and writes all {address, data} entries in the level 0 cache #0 and the level 0 cache #1 to a level 1 cache #0 and a level 1 cache #1 if all the values in the corresponding positions are equal to each other.

6. The apparatus of claim 1, wherein the fault detection and recovery unit checks whether values in corresponding positions are equal to each other by reading from the data memory, the tag memory, and the valid bit memory of the level 0 cache #0 and the level 0 cache #1, and deletes all {address, data} entries in the level 0 cache #0 and the level 0 cache #1 if any of the values in the corresponding positions are not equal to each other.

7. The apparatus of claim 6, wherein the fault detection and recovery unit instructs the load/store unit of the first processor and the load/store unit of the second processor to restart the instruction #n after deleting all {address, data} entries in the level 0 cache #0 and the level 0 cache #1.

8. A method for controlling a level 0 cache, comprising:
checking, by a fault detection and recovery unit, a number of {address, data} entries stored in a level 0 cache #0 and a level 0 cache #1 whenever a new address and data from a load/store unit of a first processor and a load/store unit of a second processor are stored in the level 0 cache #0 and the level 0 cache #1;
stalling, by the fault detection and recovery unit, a pipeline when the number of {address, data} entries stored in the level 0 cache #0 and the level 0 cache #1 is equal to or greater than N, where N is a predetermined positive integer;
reading from, by the fault detection and recovery unit, data memory, tag memory, and valid bit memory of the level 0 cache #0 and the level 0 cache #1, after stalling the pipeline; and
performing, by the fault detection and recovery unit, a write-back operation or a flush operation depending on whether values in corresponding positions are equal to each other based on the read information.

9. The method of claim 8, wherein stalling the pipeline is configured to prevent a request for reading from and writing to the level 0 cache #0 and the level 0 cache #1 from being received.

10. The method of claim 8, wherein performing the write-back operation or the flush operation is configured to write all the {address, data} entries in the level 0 cache #0 and the level 0 cache #1 to a level 1 cache #0 and a level 1 cache #1 if all values in corresponding positions are equal to each other based on the read information.

11. The method of claim 8, wherein performing the write-back operation or the flush operation is configured to delete all {address, data} entries in the level 0 cache #0 and the level 0 cache #1 if any values in corresponding positions are not equal to each other based on the read information.

12. The method of claim 11, further comprising instructing the load/store unit of the first processor and the load/store unit of the second processor to restart an instruction #n after deleting all {address, data} entries in the level 0 cache #0 and the level 0 cache #1.

13. The method of claim 8, further comprising continuing to store the new address and data if the number of {address, data} entries stored in the level 0 cache #0 and the level 0 cache #1 is less than N as a result of checking the number of {address, data} entries stored in the level 0 cache #0 and the level 0 cache #1.

* * * * *